United States Patent
Samson

(10) Patent No.: US 6,901,944 B2
(45) Date of Patent: Jun. 7, 2005

(54) FLUID CONTROL APPARATUS

(76) Inventor: William Darcy Samson, Unit 7/11-13 Curtis Street, Caringbah, New South Wales (AU), 2229

( * ) Notice: Subject to any disclaimer, the term of this patent is extended or adjusted under 35 U.S.C. 154(b) by 235 days.

(21) Appl. No.: 10/265,804

(22) Filed: Oct. 7, 2002

(65) Prior Publication Data
US 2004/0065365 A1 Apr. 8, 2004

(51) Int. Cl.[7] .............................................. F16K 15/20
(52) U.S. Cl. .................. 137/224; 137/227; 137/505.25; 152/427
(58) Field of Search .................. 137/224, 225, 137/227, 505.25; 152/427

(56) References Cited

U.S. PATENT DOCUMENTS

| | | | | |
|---|---|---|---|---|
| 511,706 A | * | 12/1893 | Lamplugh et al. | 137/224 |
| 1,045,330 A | * | 11/1912 | Schweinert et al. | 137/227 |
| 1,405,436 A | * | 2/1922 | Pulverman | 137/227 |
| 1,479,307 A | * | 1/1924 | McAneny | 137/224 |
| 1,482,947 A | * | 2/1924 | Shorts | 137/227 |
| 1,724,063 A | * | 8/1929 | Anderson | 137/225 |
| 1,832,114 A | * | 11/1931 | Georgias | 137/225 |
| 3,911,988 A | * | 10/1975 | Richards | 137/225 |
| 6,293,297 B1 | * | 9/2001 | Maldonado et al. | 137/227 |
| 2002/0157707 A1 | * | 10/2002 | Sampson | 137/224 |

* cited by examiner

Primary Examiner—John Rivell
(74) Attorney, Agent, or Firm—Jacobson and Johnson

(57) ABSTRACT

There is an apparatus for regulating air flow into a rim mounted pneumatic vehicle tire. The apparatus has an elongated valve housing 1 with an inlet end 1A, an outlet end 2 and a central portion between the outlet and inlet. The outlet end includes a rim insertion portion 3 configured to fit into an aperture in the tire rim. There is a pistion 8 disposed within the housing. The piston includes a valve member 19. A coil spring 22 acts between the housing and piston so that in use of the apparatus the piston is biased to a open position for passage of air into the tire and is movable against the spring bias under air pressure build-up in the tire to a closed position at which the valve member seals against a valve seat. The spring acts in tension and the piston and spring are located in the central portion of the housing clear of the rim insertion portion. The rim insertion portion is of a reduced size not obstructive to the mounting of the tire.

9 Claims, 2 Drawing Sheets

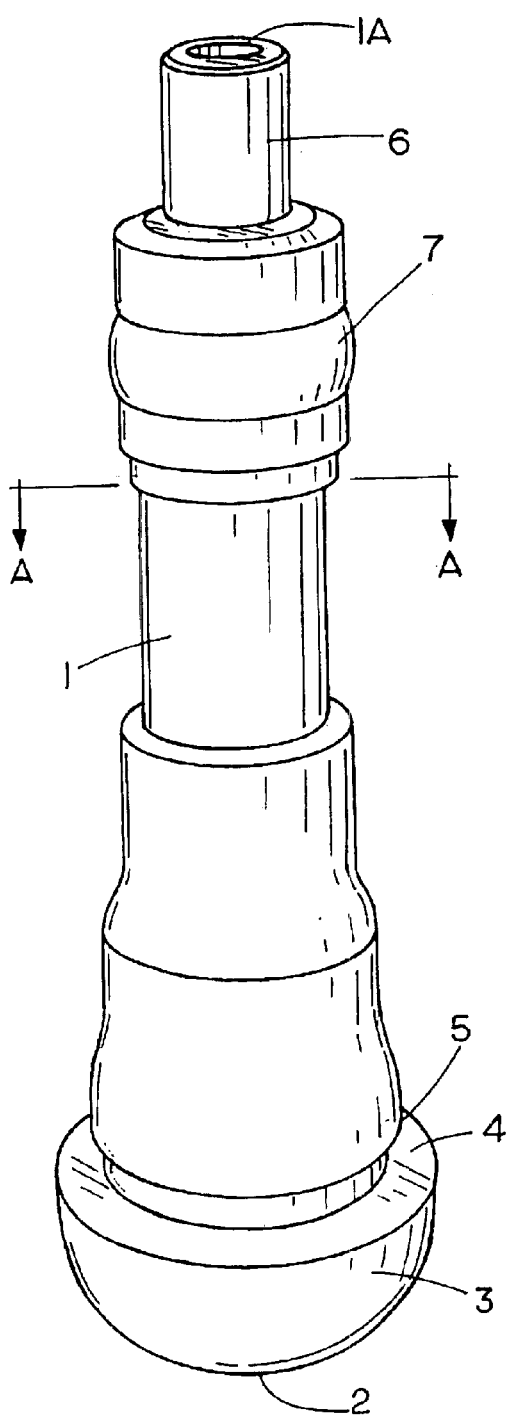
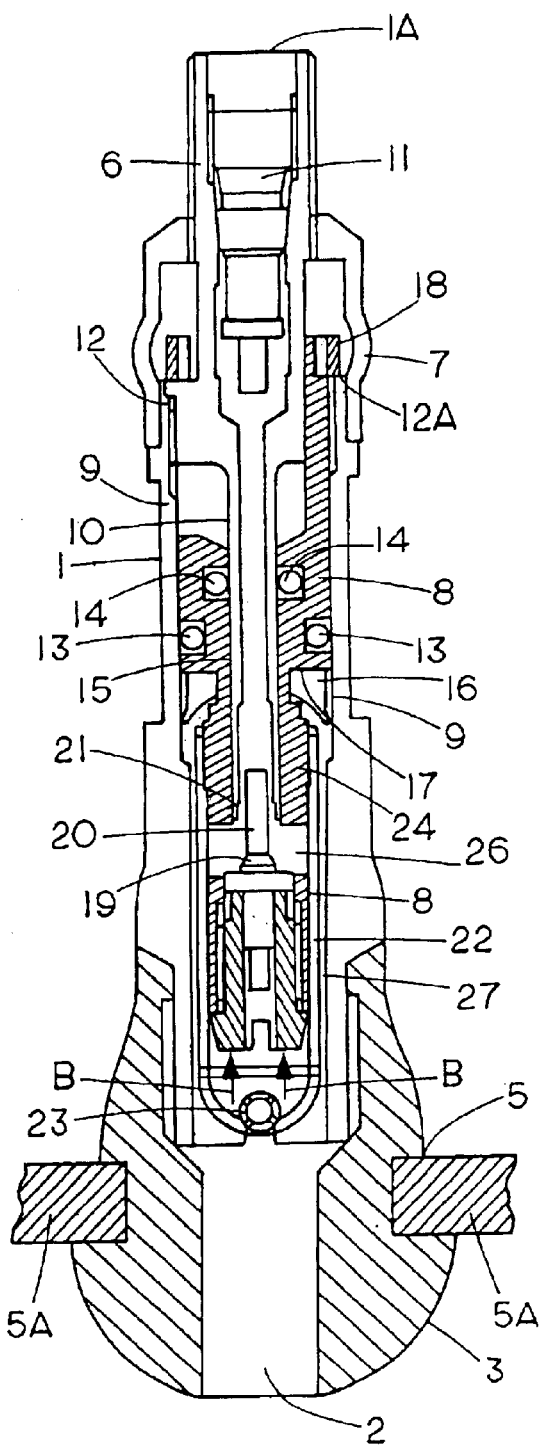

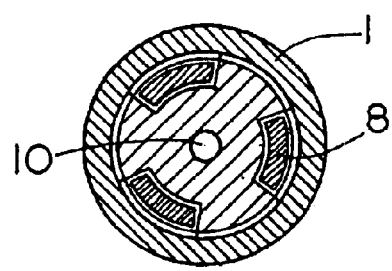
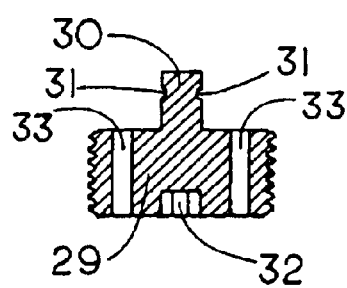
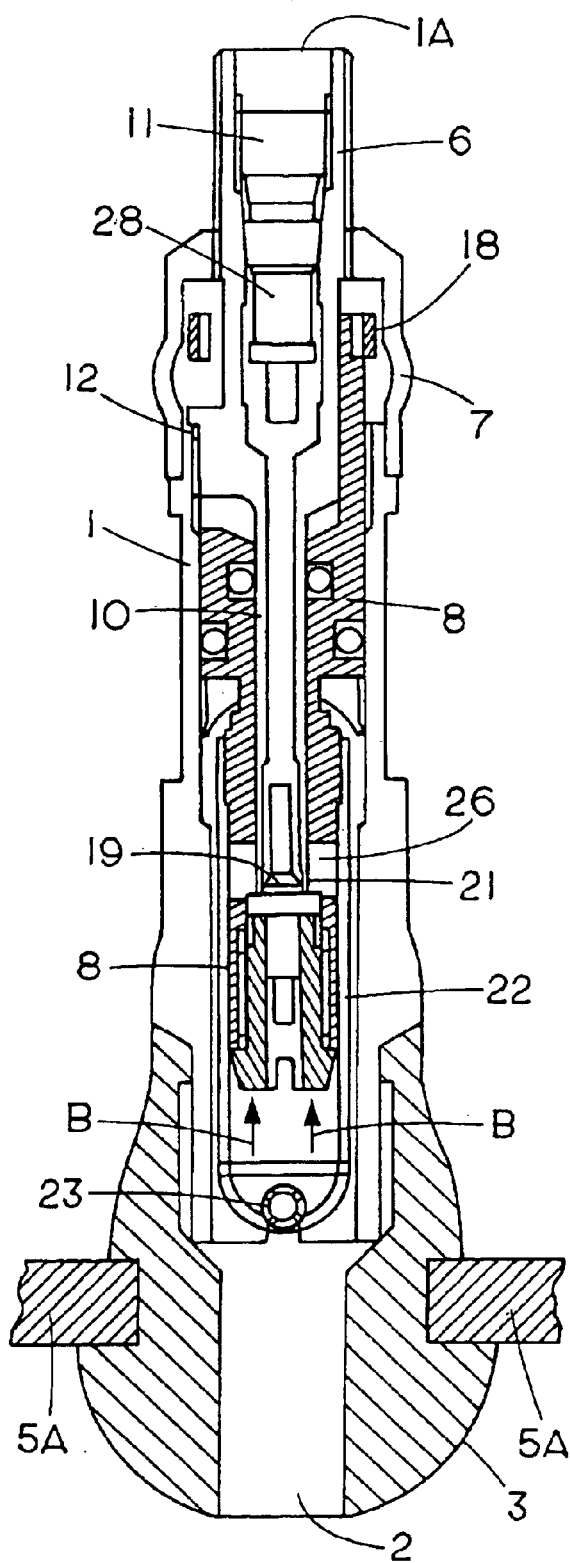

A—A of FIG. 1, FIG. 4 is

FLUID CONTROL APPARATUS

FIELD OF THE INVENTION

This invention relates to fluid control devices. More particularly although not exclusively it discloses an improved pressure cutoff valve for vehicle tyres.

BACKGROUND TO THE INVENTION

Correct pressure in vehicle tyres is of considerable importance. Excessive pressure can cause premature tread wear and loss of traction in the wet. Low pressure on the other hand can cause loss of stability when cornering and tyre failure from excessive wall flexing. While most service stations provide facilities for drivers to check their tyres the gauges are often defective or at best inaccurate. In order to alleviate such problems valves have been proposed for tyres which during filling automatically cut off the air supply once a preset pressure is reached. The user therefore does not need to be concerned about monitoring tyre pressure during filling. Rather it is only necessary to maintain the air hose fitting on the tyre valve until it automatically cuts off. These valves typically use a piston which is biased to an open position by a compression spring during filling but is moved against said bias to a closed position when an applied force from the internal tyre pressure reaches a preset amount of say 200 kpa. Existing valves have the disadvantage however that the compression spring and piston are located in the base of the valve assembly which is therefore enlarged and protrudes a substantial distance through into the interior of the tyre rim. This obstructs the fitting of the tyre and can result in the base of the valve housing being damaged during initial inflation as the tyre bead expands onto the rim.

SUMMARY OF THE INVENTION

It is therefore an object of this invention to ameliorate the aforementioned disadvantage and accordingly a apparatus for regulating air flow into a rim mounted pneumatic vehicle tyre is disclosed, said apparatus having an elongated valve housing with an inlet end, an outlet end and a central portion, the outlet end including a rim insertion portion configured to fit into an aperture in the tyre rim, a piston disposed within said housing and including a valve member, a coil spring acting between said housing and piston whereby in use of said apparatus the piston is biased to an open position for passage of air into said tyre and is movable against said bias under force of air pressure build-up in said tyre to a closed position at which the valve member seals against a valve seat to close off said passage of air wherein the spring acts in tension and said piston is located within said central portion of the housing clear of the rim insertion portion so that said rim insertion portion is of a reduced size not to obstruct the mounting of said tyre.

Preferably said piston is fitted with a visual indicator to show position.

It is further preferred that the valve housing be fitted with a schrader type one way valve at the inlet end.

BRIEF DESCRIPTION OF THE DRAWINGS

The currently preferred embodiment of this invention will now be described with reference to the attached drawings in which:

FIG. 1 is a perspective side view of an automobile tyre valve according to the invention, FIG. 2 is a vertical cross-sectional of the valve of FIG. 1 when in the open position, and FIG. 3 is a cross-sectional view along the lines A—A of FIG. 1, FIG. 4 is a cross-sectional view similar to FIG. 2 but with the valve in the closed position, and FIG. 5 is a cross-sectional view of a spring tension adjustment plug which can be fitted to the valve of FIG. 1.

DETAILED DESCRIPTION OF THE PREFERRED EMBODIMENT

Referring first to FIGS. 1 and 2 the valve housing 1 may comprise an elongated cylindrical casing with an inlet 1A at the top as shown and an outlet 2 at the bottom. The outlet end of the housing preferably comprise an insertion sleeve 3 with a groove 4 and shoulder 5 which adapt said sleeve for fitting through an aperture in a pneumatic tyre rim 5A. Preferably the outlet end is moulded from rubber or other suitable material to obtain the necessary pressure tight seat to the rim. At the inlet end 1A there is a short pipe section 6 of reduced diameter to connect with an air supply hose nozzle such as that provided at service stations. Immediately below this is a transparent cap 7 through which the position of an internal indicator band can be viewed as described later.

Referring more specifically to FIGS. 2 and 3 there is a piston 8 which is longitudinally slidable between the housing cylinder wall 9 and a central tube 10. The tube 10 is part of a sub-assembly which includes the pipe 6 with a schrader type inlet valve 11 of known construction. This sub-assembly is threaded into or otherwise rigidly connected to the housing at 12. The transparent cap 7 also fits onto the housing at this location and provides a view window between the top of said housing 12A and the pipe 6. As the pipe 6 and housing are fixed relative to one another this cap 7 takes no load and can therefore be of nonstructural material such as a low cost plastic. There are O-rings 13, 14 fitted to provide a sliding pressure tight fit between both the outside of piston 8 and cylinder 9 as well as the internal piston bore 15 and tube 10. Preferably a directional low friction cup seal 16 may also be fitted into a nich 17 in the piston immediately below O-ring 13 to further ensure against air leakage between the piston and cylinder. The piston 8 at its upper end mounts the indicator band 18 and towards the lower end the bore 15 is fitted with a valve member having a bevelled head 19 and upwardly directed needle 20. The needle extends up through a seat 21 formed at the base of tube 10. The seat is shaped to form a pressure tight seal when engaged by the bevelled head 19 of the valve member. There is also a tension spring 22 which acts between a transverse pin 23 located across the housing just above the insertion sleeve and the centre 24 of the piston. Preferably the spring at one end hooks over pin 23 and at the other end seats in spiral grooves around the centre of the piston. In FIG. 2 the piston is held to its lowermost position where the band 18 abuts the top of the housing. In accordance with this invention it will be noted that the tension spring 22 and piston 8 move within the centre portion of the housing above the insertion sleeve 3. This allows the rim insertion sleeve at the outlet end to be greatly reduced in diameter and length. It therefore provides virtually no obstruction to the tyre bead during initial mounting and inflation of said tyre on the rim. The moulded rubber construction of the insertion sleeve with the current embodiment also allows the housing 1 to flex relative to the tyre rim to reduce the chances of breakage.

In the open position of FIG. 2 a supply of pressurised air is able to flow through the inlet schrader valve 11, down through tube 10, around open valve member 19, through ports 26, along clearance space 27 between the spring 22 and housing to enter the tyre (not shown) through outlet 2. As the pressure inside the tyre builds up however a force (arrow B) acts against the underside of the piston moving it upward. At a preset cutoff pressure of say 200 kpa determined by the underside area of the piston 8, the deflection constant of the spring 22 and the position of valve seat 21 the upward displacement of the piston 8 causes the valve head 19 to close into said seat as shown in FIG. 4. This cuts off further air flow into the tyre. It will also be noted from FIG. 4 that the band 18 simultaneously moves upward within transparent cap 7 to indicate that the preset pressure has been reached in the tyre and the cutoff valve 19 is closed. If tyre pressure subsequently falls below this preset pressure the piston and indicator band 18 move downwardly under the tension force of spring 22 to show low pressure and the valve 19 opens in preparation for filling. Leakage of air out of the tyre however is prevented by the one way operation of the schrader valve 11 which only allows discharge through deliberate depression of insert stem 28.

As an alternative to the fixed transverse pin 23 for holding the lower end of the spring 22 a threaded anchor plug 29 as shown in cross-section by FIG. 5 may be turned into the housing at the same location. This plug has an upstanding pin 30 with a circumferential groove 31. The lower end of the spring is then shaped to seat in this groove so that rotation of the plug using an allen key or the Like on socket 32 adjusts the spring tension and thus the cutoff pressure of the valve. A series of apertures 33 around the periphery of the plug allows air to pass through to the outlet 2.

It will thus be appreciated that this invention at least in the form of the embodiment disclosed provides a novel and useful improvement to vehicle tyre valves. Clearly however the example described is only the currently preferred form of the invention and a wide variety of modifications may be made which would be apparent to a person skilled in the art. For example the shape and configuration of the transparent cap and the preset cutoff pressure may be changed according to application. Also while it is currently preferred to construct the valve and housing from a corrosion resistant metal such as brass the invention extends to the use of any other suitable material.

For the purposes of this specification expressions such as "top", "bottom", "below", "upper" and "lower" etc refer to the valve housing in one position of use as illustrated are are not to be taken as necessarily limiting.

What is claimed is:

1. Apparatus for regulating air flow into a rim mounted pneumatic vehicle tire, said apparatus having an elongated valve housing with an inlet end, an outlet end and a central portion, the outlet end including a rim insertion portion configured to fit into an aperture in the tire rim, a piston disposed within said housing and including a valve member, a coil spring acting between said housing and piston whereby in use of said apparatus the piston is biased to an open position for passage of air into said tire and is movable against said bias under force of air pressure build-up in said tire to a closed position at which the valve member seals against a valve seat to close off said passage of air wherein the spring acts in tension, (and) said piston and spring are located within said central portion of the housing clear of the rim insertion portion so that said rim insertion portion is of a reduced size not obstructive to the mounting of said tire, a band fitted to the piston to show the position thereof is visible through a transparent can fitted to the housing and in use of said apparatus the can carries no structural load and is made of moulded plastic.

2. The apparatus as claimed in claim 1 wherein said spring acts between a pin located at the outlet end of said housing and a centre part of said piston.

3. A apparatus as claimed in claim 2 wherein the piston is slidable along a central tube and cylinder wall in said housing, said tube being part of a sub-assembly which is connected to said housing.

4. The apparatus as claimed in claim 3 wherein the piston at an upper end thereof mounts said band and towards the lower end thereof carries said valve member shaped to form a pressure tight seal when engaged in the valve seat located at the base of said central tube.

5. The apparatus as claimed in claim 4 wherein the inlet end is fitted with a schrader valve.

6. The apparatus as claimed in claim 5 wherein the rim insertion portion includes a rubber sleeve with a shoulder and groove into which the edges of said rim aperture fit.

7. The apparatus as claimed in claim 6 wherein the valve member has a bevelled head and upwardly directed needle which extends through the valve seat.

8. The apparatus as claimed in claim 7 wherein the valve housing includes a transparent cap through which an internal indicator can be viewed, to show the position of said piston.

9. The apparatus as claimed in claim 8 wherein said cap carries no structure load during the operation of the valve.

* * * * *